United States Patent [19]

Kirsch et al.

[11] Patent Number: 4,982,421
[45] Date of Patent: Jan. 1, 1991

[54] VIRTUAL PRIVATE LINE SERVICE

[75] Inventors: Larry W. Kirsch, Bolingbrook, Ill.; David A. Redberg, Red Bank, N.J.

[73] Assignee: AT&T Bell Laboratories, Murray Hill, N.J.

[21] Appl. No.: 428,267

[22] Filed: Oct. 27, 1989

[51] Int. Cl.⁵ .............................................. H04M 3/42
[52] U.S. Cl. ..................................... 379/216; 379/219
[58] Field of Search ............... 379/216, 355, 356, 357, 379/358, 359, 354, 40, 51, 219, 201

[56] References Cited

U.S. PATENT DOCUMENTS

| | | | |
|---|---|---|---|
| 4,119,805 | 10/1978 | Pratelli | 379/354 |
| 4,348,554 | 9/1982 | Asmuth | 179/18 B |
| 4,802,199 | 1/1989 | Lange et al. | 379/216 |

OTHER PUBLICATIONS

"Notes On The BOC Intra-Lata Networks-1986", Technical Reference TR-NPL-000275, Issue 1, Apr. 1986, AT&T & Bell Communications Research publication, pp. 3-11.
"Electronic Switching Systems, No. 1, Arranged With 4-Wire Features Switched Hot Lines Program", Program Specification, PD-2A151-01, Mar. 1971, Bell Telephone Laboratories, Incorporated, AT&TCo SPCS, 6 pages.
"Autovon Interface Feature", AT&T Brochure 5DS-190-100, Nov. 1987, Issue 3.00, pp. 11-26.
"Feature Document, Manual Line Service Features 2-Wire No. 1 and No.1A Electronic Switching Systems", AT&T brochure, AT&TCo SPCS, Section 231-090-173, Issue 2, Jun. 1981, pp. 1-24.

Primary Examiner—James L. Dwyer
Attorney, Agent, or Firm—Werner Ulrich

[57] ABSTRACT

This invention relates to a method and apparatus for providing point-to-point line service by providing a switched communication circuit only whenever either terminal of the private line service lifts its receiver. In a departure from the prior art, and in order to ensure that no other stations can get access to the private line terminals, the service is provided by assigning both terminals to a common software defined network, and by routing the call through the software defined network using a non-dialable routing number derived from the identity of a calling station. Whenever either terminal lifts its receiver, a connection is set up within the software defined network; this prevents callers from outside the software defined network from accessing either terminal. Alternatively, an ingress switch of a public switched network can directly provide a non-dialable routing number for routing a call from a station that has gone off-hook to a predetermined destination identified in such a way that it cannot be reached by dialing a call. Advantageously, fully private line service is provided without requiring dedicated facilities.

18 Claims, 2 Drawing Sheets

VIRTUAL PRIVATE LINE SERVICE

TECHNICAL FIELD

This invention relates to methods and apparatus for providing switched private line service.

PROBLEM

In certain telecommunications applications, it is vital that communications between two individuals be set up almost instantaneously. An example is the financial industry where it is important that traders, typically dealing with large active accounts, be immediately connectable to their customers who might be the representatives of pension funds or large venture capitalists. The connection should exclude all except the two individuals needing to communicate. The normal way of handling the requirements for such instantaneous and dedicated communications is to provide dedicated private line service between the trader and each of his customers or clients. In the prior art, these dedicated private lines include facilities for automatic ring down so that as soon as one end of the connection picks up a handset, the phone at the other end rings. Typically, the trader would have a turret with a separate appearance for each of his clients that is connected by a private circuit.

Such arrangements are obviously quite expensive, especially for the cases in which the customer is separated from the trader by a large geographic distance. Such private lines typically have low occupancies, on the order of 10 percent or less. Therefore, the valuable transmission resources of the public switched network which are used to interconnect the private line terminations of the two ends of the connection are inefficiently used. At the same time, the simple solution of setting up dialed connections is undesirable because of the relatively long setup time for the calls, which active customers would find unacceptable compared to private line connections, and because of the substantial probability, especially during periods of crises in the stock, bond and commodity markets, of not being able to get through to the trader because of contention for the trader's line.

Special private line services have been offered in the past in commercial systems and in military systems, such as the AUTOVON network. Direct connect service wherein a customer is considered to have dialed a pre-stored number as soon as the customer goes off-hook is available in commercial systems today. In such an arrangement, there is nothing to prevent any other customer from dialing the same number, thus blocking access from the primary caller to a single line telephone. Further, the set-up time of such connections is undesirably long.

In the AUTOVON system, which uses interoffice signaling comprising a priority indication, calls from a primary caller to the pre-stored destination are completed only if the call is identified as being a priority call; this prevents unwanted callers from blocking access from the primary caller. Commercial systems do not have similar arrangements for identifying direct connect calls.

A problem of the prior art, therefore, is that there is no efficient way of providing low-cost point-to-point commercial private line service with short set-up times to those customers who have a relatively low usage of the private line wherein customers other than the primary customer are denied access to the connection.

SOLUTION

The above problem is solved and an advance is made over the prior art in accordance with the principles of this invention wherein each of the two ends of a private line are connected to a common software defined network and a connection is set up between these two ends in response to an origination from either end.

A software defined network, described, for example, in R. L. Asmuth, U.S. Pat. No. 4,348,554, is a network which uses the hardware facilities of a public switched network to provide private network service, the private network service being defined in data tables of a shared database of the public switched network. Advantageously, the arrangements for a software defined network are such that outsiders cannot get access to stations within the netowrk unless there is specific permission for such access. In accordance with one aspect of the invention, the data tables used for defining attributes of particular terminals in a software defined network are used to define the connection between the end points of the users of the private line service by providing data for a specific member of the network. This data is in the form of a routing number, not dialable by the customer, for routing the call to a destination switch, where the routing number is translated to identify the access line connected to the other station of the virtual private line.

This service is implemented so that a connection is set up in response to either end of the private line going off-hook without requiring further dialing. Advantageously, this reduces the call setup time.

In accordance with one feature of the invention, each end of the private line can access or be accessed by only the other end of the private line. In one embodiment, this is accomplished by assigning a number not dialable by other stations in the software defined network to the two ends of the private line connection. Advantageously, this arrangement prevents the private line from being rendered unusable by unwanted incoming calls.

In accordance with another feature of this invention, a circuit through the switched network is selected for each call so that if a particular circuit is detected as being out of service, that circuit will not be used, or if a circuit is faulty but undetected, it will not be used repeatedly. Advantageously, such an arrangement prevents a loss of private line service, if a particular facility used by a dedicated private line service fails. In accordance with another aspect of the invention, virtual private line customer stations are connected directly to an interexchange carrier (IXC) switch. Advantageously, this reduces the call set-up time substantially for calls requiring IXC transport.

In accordance with one feature of this invention, when the level of traffic in the public switched network reaches a threshold indicating that the network is close to being overloaded, network management controls are invoked which give a higher grade of service to priority calls than to other calls. For example, at a certain traffic level, only 50 percent of normal calls may be attempted to be completed, while 100 percent of the priority calls are attempted to be completed. In accordance with this feature, the private line connections are treated as priority calls.

The database for a software defined network is maintained in separate centralized network control points for serving the entire software defined network. In accordance with one alternate embodiment of the invention, in order to reduce the setup time for these virtual private line connections, data is maintained in an auxiliary database of each action point connected to one of the ends of a virtual private line. This auxiliary database permits the action point to translate directly from the identification of one end of the virtual private line to the identification of the other end, thus, saving the time required to obtain this information from the software defined network database. The identification of the other end is a routing number not dialable by a customer, thus preventing anyone except the caller from calling the called station of the virtual private line. Examples of non-dialable numbers are numbers whose area code or office code begins with a 0 or 1. When the ingress switching system connected to the customer with virtual private line service detects an off-hook supervisory signal, the system translates the identification of the source of the off-hook signal to an identification of an egress switching system, for communicating to the called end of the connection, and to a number for use by that system to identify the called end. The identifying number is then sent in a signaling message along with other information to ensure that the signaling message is transmitted to the egress switch.

DETAILED DESCRIPTION

Figure 1:
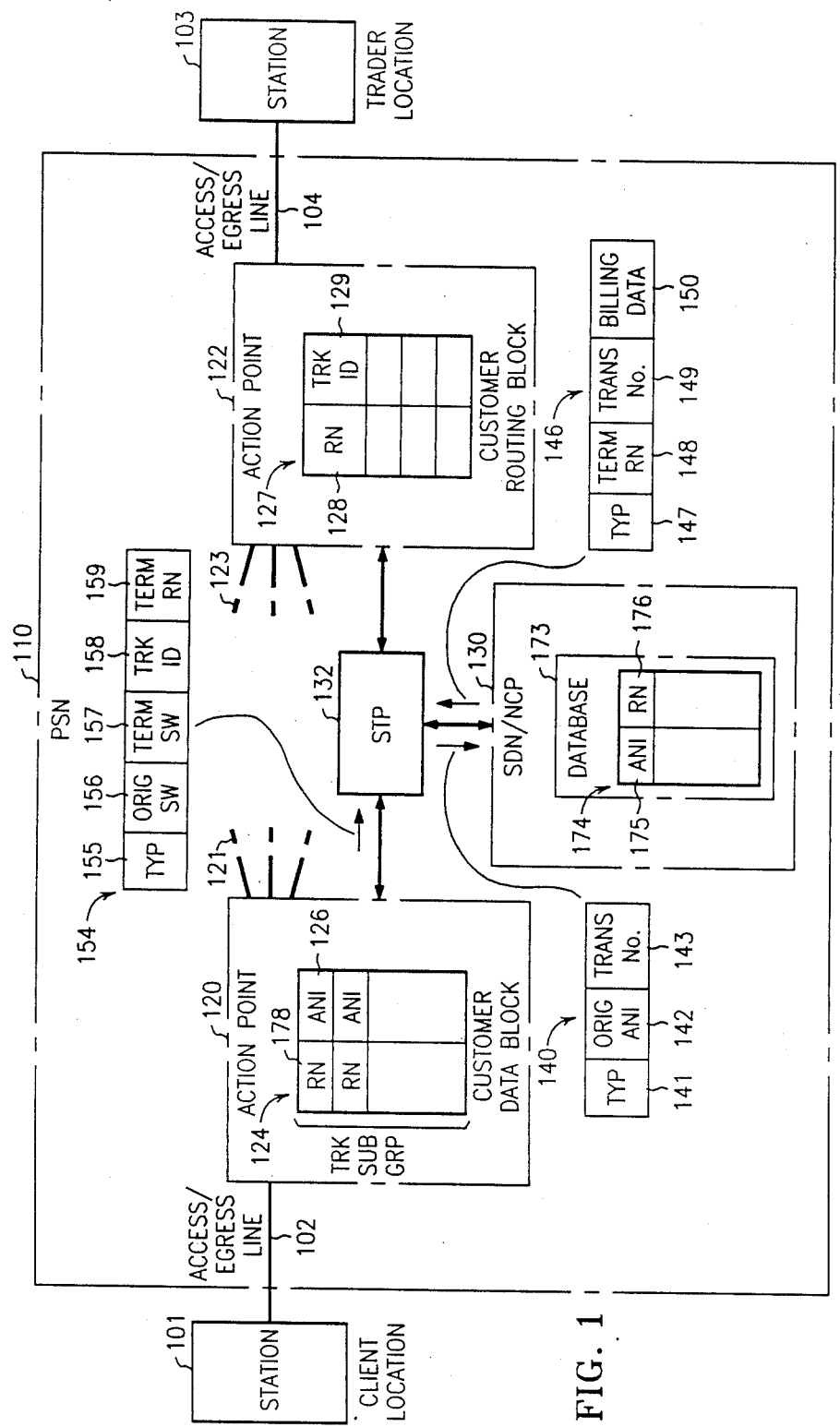
FIG. 1 is a block diagram of the operation of one embodiment of the invention showing the required switching systems, databases, and data messages.

FIG. 1 is a block diagram which illustrates the operation of applicants' invention. Blocks 101 and 103 are the two ends of a software defined private line. They are connected via access/egress lines 102 and 104, respectively, to a public switched network 110 which includes a software defined network. Stations 101 and 103 are served by this software defined network. The software defined network could include only the two stations 101 and 103, or could include many other such software defined private lines or could include additional software defined network stations.

Public switched network 110 includes two action points (ACPs) 120 and 122 connected, respectively, to stations 101 and 103. These ACPs are toll switches such as the 4 ESS TM switch manufactured by AT&T Technologies, Incorporated, and described in *The Bell System Technical Journal*, Vol. 56, No. 7, pages 1015-1320. The ACPs 120 and 122 communicate with each other and with other switches and other databases of public switched network 110 over a common channel signaling system via links to a signal transfer point 132. They are interconnected by trunks such as trunk 121 connected to ACP 120 and trunk 123 connected to ACP 122. Software defined network control point 130 is a database which contains the data for defining software defined networks served by public switched network 110. When the client at station 101 lifts the handset, this signals an origination to ACP 120. ACP 120 performs a preliminary translation which translates each incoming port into a trunk subgroup and member number of the subgroup. The trunk subgroup number determines the type of trunk or access line, in this case, a private access line, and is used to access the particular customer data block and the member number is used to select one of the entries in a customer data block 124. The customer data block 124 contains a number referred to as an automatic number identification (ANI) number 126 that is associated with the incoming access line 102.

ACP 120, having identified the call as having a special signaling and special trunk type unique for this service call, sends a message 140 to SDN/NCP 130. The service is a special software define network service. Message 140 comprising originating ANI 142 and a transaction number 143 so that the messages associated with a particular call may be properly associated. SDN/NCP 130 comprising a database 173, makes a translation using a new table 174 of that database, which translates from the ANI 175 of the source station, to a routing number 176 for accessing the destination. This is accomplished by first examining a portion of the ANI and comparing this portion to numbers in a table, each entry in the table having a corresponding dial code. Upon finding a matching entry, the database translates the dial code to a routing number. The database 173 also contains billing information, such as the type of billing record to be written, which is returned in message 146. Destination routing number 176 is a routing number for reaching the other terminal of the software defined private network and is returned in message 146 to ACP 120. Message 146 contains a type field 147 identifying the type of message being returned, data field 148 which is a customer routing number for routing to and identifying the terminating party for the software defined private line call, a transaction number 149, which is the same as transaction number 143, to associate the message with the proper call, and billing data 150 to help prepare a billing record for the connection. ACP 120, after receiving message 146, translates the routing number to determine the egress switch, in this case, ACP 122. In one embodiment, the terminating routing number includes the egress switch number as a first part. This message is relayed by STP 132 to ACP 120 which then sends a call setup message 154 to ACP 122. The call setup message 154 includes a type field 155, the identification of the originating or ingress switch 156 (in this case, ACP 120), the identification of terminating or egress switch 157 (in this case, ACP 122), derived from the terminating routing number received from SDN/NCP 130, the identification 158 of the voice trunk selected by ACP 120 for carrying the call, and the terminating routing number 159 for routing the call within the egress switch to its destination.

When ACP 122 receives message 154, it translates to find the identification of access line 104 by translating the terminating routing number received in field 159 of message 154. ACP 122 accesses its internal customer routing block 127 which translates between the received customer routing number 159 found in the table as entry 128, and the identification of the access line or trunk 129. Thereafter, the actions necessary to set up the connection between access lines 102 and 104 are the same actions performed in setting up connections between two identified end points in any other public switched network call.

Each end has a customer routing block and a customer data block. The customer data block associates incoming call attempts from a specific port with an originating ANI which is used to uniquely identify the customer routing number for accessing the terminating party. The customer routing block at an egress switch identifies the terminating location based on a translation of the routing number.

Figure 2:
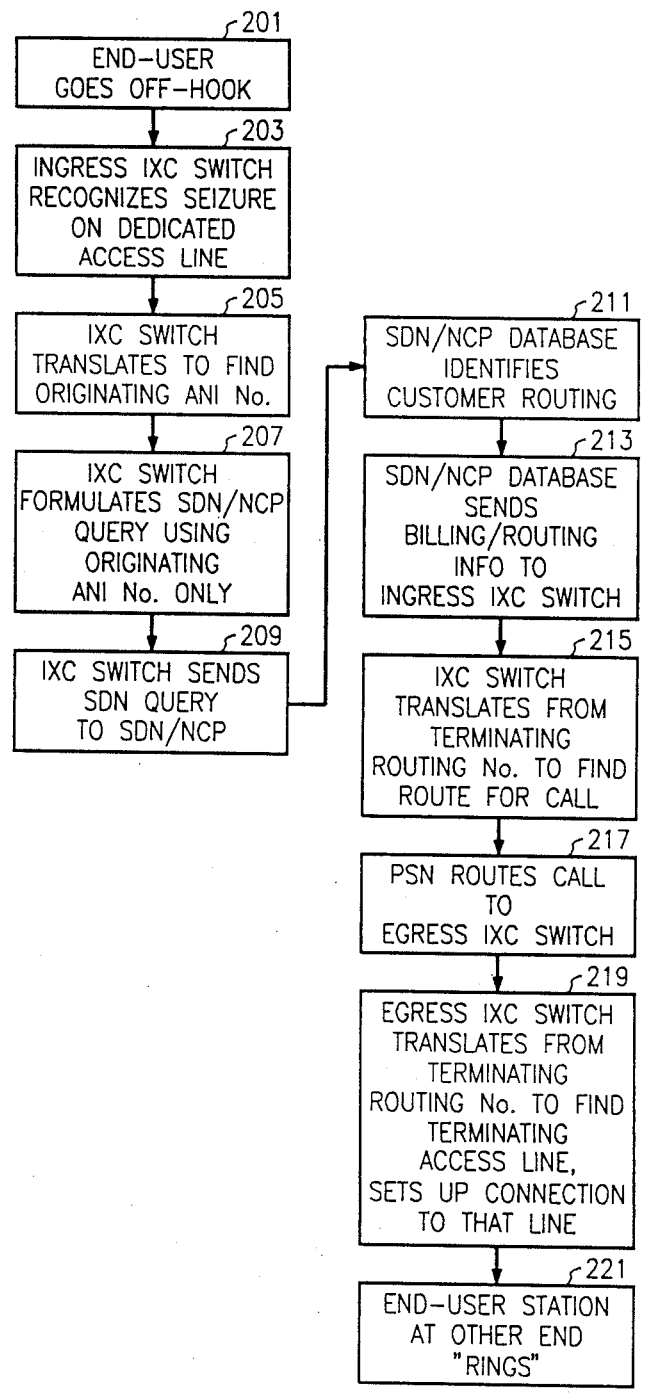
FIG. 2 is a flow diagram of the actions required to establish a connection.

FIG. 2 illustrates the flow of actions required to set up a software defined private line connection. In action block 201 the end user goes off-hook to originate the connection. The originating or ingress IXC switch recognizes the seizure on the dedicated access line which is identified as having a special incoming signaling type (line 102 in FIG. 1, action block 203). The IXC switch then translates from the identification of the dedicated access line to the corresponding originating automatic number identification (ANI) number (action block 205). The IXC then formulates a software defined network/network control point (SDN/NCP) query to find a routing number for reaching the other end of the software defined private line connection (in this case, access line 104). In formulating this query, only the originating ANI number is used (action block 207). This is in contrast to a conventional request for routing information in setting up a software defined network call wherein the identification of the software defined network of the originating line or trunk and the number dialed by the originating customer are used to access the information in the SDN/NCP. The originating ANI is used in preparing a billing entry in the ingress switching system.

The IXC switch sends the SDN query to the SDN/NCP (action block 209). The SDN/NCP database identifies the customer routing (action block 211) by identifying the terminating customer routing number of the software defined private line connection. This is accomplished by first locating the correct customer record based on the ANI number of the database query. The SDN/NCP database sends billing and routing information to the IXC switch (action block 213). The IXC switch, in response to this message from the SDN/NCP database translates from the terminating routing number received from that database, wherein the routing number includes an identification of the egress switch 122, to find a route for the call (action block 215). The public switched network then routes the call to the egress IXC switch (action block 217). This action is performed through the cooperative efforts of ACP 120, ACP 122 and whatever intermediate ACPs or other toll switches are necessary to set up the connection. The terminating IXC switch then translates from the terminating routing number to find the terminating access line and extends the connection to that line (action block 219). Finally, the end user station at the other end rings (action block 221).

In order to speed up the connection process, extra data can be provided, in an alternative arrangement within the database of ACP 120. This provides the terminating routing number 178 as well as the originating ANI for each end of a virtual private line. By using this additional data, the time to send a query message to SDN/NCP 130, to have the SDN/NCP 130 perform the data access and to return a response message from SDN/NCP 130 is saved. The total time saved is on the order of 2 seconds using present equipment, and reducing the call set-up time from 3.2 seconds to just over 1 second.

The terminating routing number assigned for routing to each end of the connection can be a number derived from a number dialable within a software defined network, or can be a routing number not so derivable. The advantage of using a number derived from a number dialable within the software defined network is that the virtual private line connection may be tested from a remote test desk equipped to dial as if it were a member of a software defined network. The disadvantage of using a number derived from a number dialable within the software defined network is that other terminals within the software defined network could call either end of the virtual private line connection if they find out the dialable number of that end. This disadvantage is overcome by keeping the virtual private line routing information in a separate record in the database; the only way to access that customer record is by going off hook at either end of the virtual private line connection.

In the alternative arrangement wherein the terminating routing number is stored in the ingress ACP switch, the stations of the virtual private line are not within a software defined network, but the routing numbers in both directions are non-dialable numbers, i.e., numbers which, if dialed by a customer connected to a local switch, would be rejected at that switch. The most common non-dialable numbers are those whose area code or office code begins with a 0 or a 1. From this routing number, the identification of the terminating or egress ACP is derived, and the call is processed further as described above, effectively substituting a step of translating to find the terminating routing number for steps 207, 209, 211, and 213. A remote test desk can access either end of a virtual private line connection by dialing the routing code. Using the NCP based translation, the database of the virtual private line cannot be tested from a remote test desk unless the terminating line is also identified by a dialable number, presumably secret, within a software defined network.

The arrangement can also be used for virtual private line service between ports of computers and for other data calls. For computers, it may be less necessary to make the connected switching system responsive only to the originating supervisory signal since the computer can signal rapidly. However, it may be equally important to have a rapidly established connection that is free from access by outsides and that is obtained by translating to obtain the non-dialable routing number in accordance with the principles of this invention.

It is to be understood that the above description is only of one preferred embodiment of the invention. Numerous other arrangements may be devised by one skilled in the art without departing from the spirit and scope of the invention. The invention is thus limited only as defined in the accompanying claims.

We claim:

1. A method of establishing a call from a calling station to a predetermined destination comprising the steps of:
   responsive solely to supervisory signal information from said calling station, identifying a non-dialable routing number for accessing said predetermined destination within a software defined network including said calling station; and
   responsive to said identifying, establishing a connection from said calling station to said destination.

2. The method of claim 1 wherein said identifying comprises:
   in a switching system connected by a non-switched connection to said calling station, translating from an identity of said calling station to data for identifying said predetermined destination.

3. The method of claim 1 wherein said software defined network comprises a database, shared by a plurality of switching systems, and wherein said identifying comprises:

accessing said database, from a switching system connected by a non-switched connection to said calling station, with an identification of said calling station; and responding from said database to said switching system with said routing number for routing to and identifying said destination.

4. The method of claim 3 wherein said identification of said calling station is derived by translating from an identification of an access line connected to said calling station.

5. The method of claim 1 wherein the establishing comprises:

deriving in a first switching system, connected over a first access line by a non-switched connection to the calling station, from said routing number supplied by said identifying step, an identification of a second switching system connected to said destination over a second access line by a non-switched connection;

establishing a connection between the first and second switching systems;

in the second switching system, translating from the routing number to an identification of said second access line; and establishing a connection in said second switching system from said connection between the first and second switching systems to said second access line.

6. A method of establishing a call from a calling station to a predetermined destination comprising the steps of:

responsive to an origination signal from said calling station, identifying a non-dialable routing number identifying said predetermined destination; and responsive to said identifying, establishing a connection from said calling station to said destination.

7. The method of claim 6 wherein said identifying comprises:

in a switching system connected by a non-switched connection to said calling station, translating from an identity of said calling station to said routing number.

8. The method of claim 6 wherein said staion and said destination are included in a software defined network, wherein said software defined network comprises a database, shared by a plurality of switching systems, and wherein said identifying comprises:

accessing said database from a switching system connected by a non-switched connection to said calling station, with an identification of said calling station; and responding from said database to said switching system with said routing number identifying said destination.

9. The method of claim 8 wherein said identification of said calling station is derived by translating from an identification of an access line connected to said calling station.

10. The method of claim 6 wherein the establishing comprises:

deriving in a first switching system, connected over a first access line by a non-switched connection to the calling station, from said routing number supplied by said identifying step, an identification of a second switching system connected to said destination over a second access line by a non-switched connection;

establishing a connection between the first and second switching systems;

in the second switching system, translating from said routing number to an identification of said second access line; and establishing a connection in said second switching system from said connection between the first and second switching systems to said second access line.

11. In a switching system, apparatus for controlling establishment of a private line connection comprising:

means for detecting an origination supervisory signal from a calling station;

means, responsive solely to said means for detecting, for effecting an identification of a non-dialable routing number for accessing a predetermined destination within a software defined network including said calling station; and means, responsive to said means for effecting, for extending a call from said calling station toward said predetermined destination.

12. The switching system of claim 11 wherein said means for effecting comprises means for translating from an identity of said calling station to said routing number.

13. The switching system of claim 11 wherein said means for effecting comprises:

means for accessing a database with an identification of said calling station; and means for receiving said routing number from said database.

14. The switching system of claim 11 wherein said means for extending comprises:

means for deriving from said routing number an identification of a second switching system connected by a non-switched connection to said predetermined destination.

15. The switching system of claim 11 further comprising:

means for translating from a non-dialable routing number of an incoming call to data for identifying a called station, whereby said system can process terminating and originating calls.

16. In a switching system, apparatus for controlling establishment of a private line connection comprising:

means for detecting an origination signal from a calling station;

means, responsive to said means for detecting, for effecting an identification of a non-dialable routing number identifying a predetermined destination for a call from said calling station; and means, responsive to said means for identifying, for extending a call from said calling station toward said predetermined destination.

17. The switching system of claim 16 wherein said means for effecting comprises means for translating from an identity of said calling station to said routing number.

18. The switching system of claim 16 wherein said means for extending comprises means for deriving from said routing number an identification of a second switching system connected by a non-switched connection to said predetermined destination.

* * * * *